(12) United States Patent
Kawakami et al.

(10) Patent No.: US 7,769,846 B2
(45) Date of Patent: Aug. 3, 2010

(54) COMMUNICATION SYSTEM, COMMUNICATION APPARATUS, COMMUNICATION METHOD, RECORDING MEDIUM AND PROGRAM

(75) Inventors: Takashi Kawakami, Tokyo (JP); Manabu Kii, Tokyo (JP); Motoyuki Takai, Tokyo (JP)

(73) Assignee: Sony Corporation, Tokyo (JP)

(*) Notice: Subject to any disclaimer, the term of this patent is extended or adjusted under 35 U.S.C. 154(b) by 1037 days.

(21) Appl. No.: 10/269,832

(22) Filed: Oct. 11, 2002

(65) Prior Publication Data

US 2003/0078941 A1 Apr. 24, 2003

(30) Foreign Application Priority Data

Oct. 12, 2001 (JP) ............................. 2001-315039

(51) Int. Cl.
*G06F 15/173* (2006.01)
(52) U.S. Cl. .................... 709/224; 709/201; 709/205
(58) Field of Classification Search ............... 709/224, 709/201, 203
See application file for complete search history.

(56) References Cited

U.S. PATENT DOCUMENTS

| 5,963,916 | A * | 10/1999 | Kaplan | 705/26 |
| 6,170,060 | B1 * | 1/2001 | Mott et al. | 726/29 |
| 6,587,837 | B1 * | 7/2003 | Spagna et al. | 705/26 |
| 6,611,812 | B2 * | 8/2003 | Hurtado et al. | 705/26 |
| 6,757,691 | B1 * | 6/2004 | Welsh et al. | 707/104.1 |
| 6,947,922 | B1 * | 9/2005 | Glance | 707/3 |
| 7,174,312 | B2 * | 2/2007 | Harper et al. | 705/35 |
| 2002/0041692 | A1 * | 4/2002 | Seto et al. | 381/86 |

FOREIGN PATENT DOCUMENTS

JP 9-214935 8/1997

OTHER PUBLICATIONS

Shardanand et al. "Social Information Filtering: Algorithms for Automating 'Word of Mouth'", ACM, 1995.*
U.S. Appl. No. 10/209,178, filed Jul. 31, 2002, Takashi Sato et al.
U.S. Appl. No. 10/210,183, filed Aug. 1, 2002, Tanaka Izuru.
Kurabayashi, Noriyuki, "Zinger: Conservation Support Agent Based on Interest Similarity," Information Processing Society of Japan Report 2001-HI-94, Information Processing Society of Japan, vol. 2001, No. 72, pp. 53-60, Jul. 19, 2001.
Kitamura, Yasuhiko, "Internet Agent Intellectual Information Search and Automated Information Distribution, bit," Japan, Kyoritsu-Publishing Co. Ltd., vol. 31, No. 2, pp. 7-14, Feb. 1, 1999.

* cited by examiner (Continued)

*Primary Examiner*—Larry Donaghue
*Assistant Examiner*—Nicholas Taylor
(74) *Attorney, Agent, or Firm*—Oblon, Spivak, McClelland, Maier & Neustadt, L.L.P.

(57) ABSTRACT

In one aspect a communication system is provided. A terminal generates predetermined music information on a reproduced piece of music and reproduction frequency information including a reproduction count of the piece of music. The terminal transmits the reproduction frequency information and its own apparatus ID to a server. The server computes a similarity coefficient between pieces of music reproduced by the terminal and another terminal on the basis of the terminals' reproduction frequency information and apparatus IDs. The server catalogs the computed similarity coefficient on a favorite list by associating the similarity coefficient with the reproduction frequency information and the apparatus IDs. The server identifies a similar piece of music reproduced by the terminal and the other terminal by referring to the favorite list and selects a piece of music reproduced by the other terminal but not reproduced by the terminal.

15 Claims, 12 Drawing Sheets

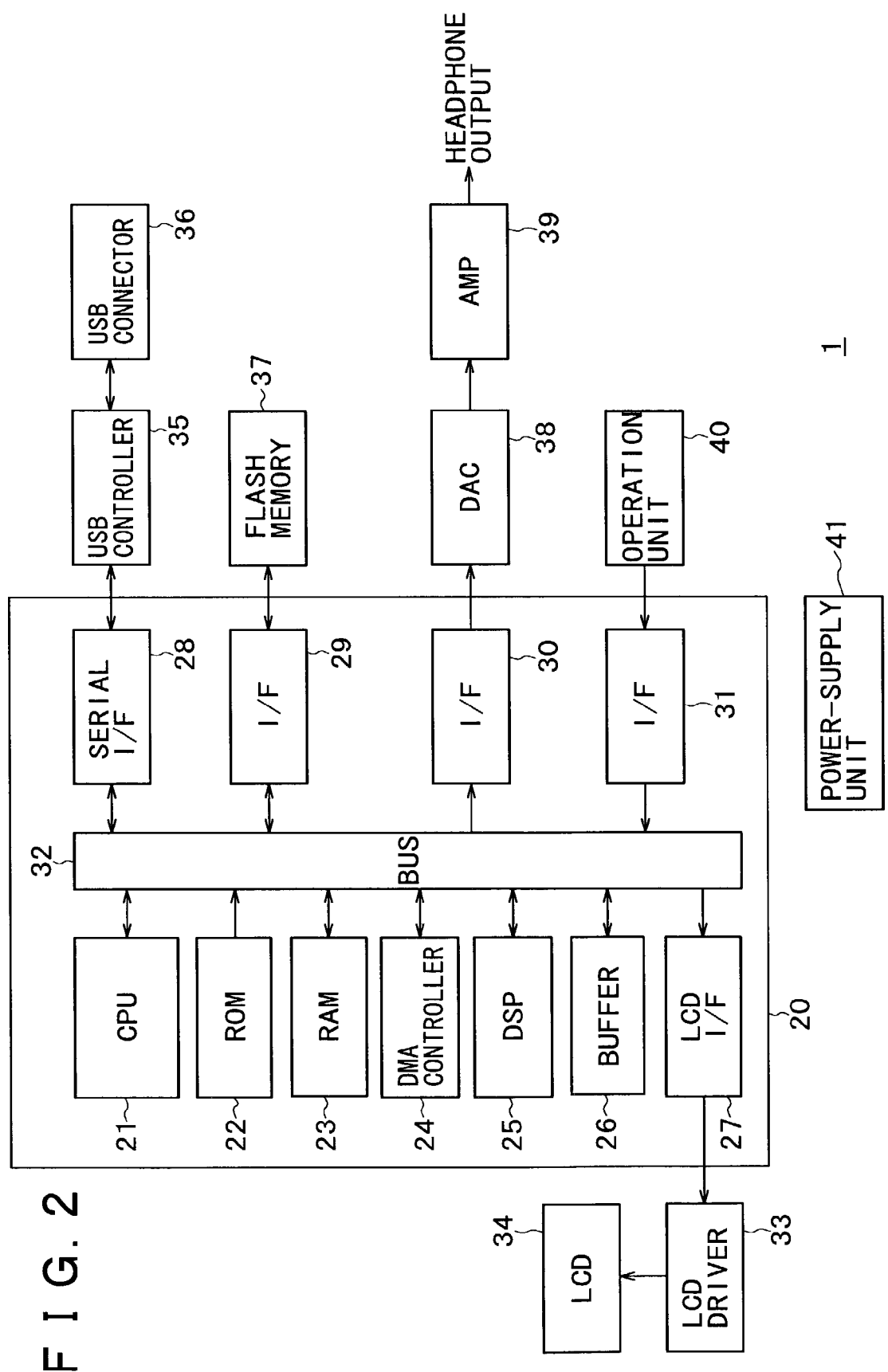
F I G. 2

FIG. 5

```
<TOP3>
<SONG RANK=1>
    <ARTIST "ARTIST A" />
    <TITLE "SONG A" />
    <LASTUPDATE "2000.12.26" />
    <COUNT 33/>
</SONG>

<SONG RANK=2>
    <ARTIST "ARTIST B" />
    <TITLE "SONG B1" />
    <ALBUMTITLE" ALBUM B" />
    <LASTUPDATE "2001.08.12" />
    <COUNT 10/>
</SONG>

<SONG RANK=3>
    <ARTIST "ARTIST C" />
    <TITLE "SONG C" />
    <LASTUPDATE "2001.09.24" />
    <COUNT 5 />
</SONG>
</TOP3>
```

FIG. 9

| ARTIST NAME | ALBUM TITLE | SONG TITLE | TERMINAL 1-1 | TERMINAL 1-2 | TERMINAL 1-3 |
|---|---|---|---|---|---|
| ARTIST A | ALBUM A | SONG A | 0.947119104 | 0 | 0 |
| ... | ... | ... | 0 | 0 | 0 |
| ARTIST B | ALBUM B | SONG B1 | 0.287005789 | 0.942809 | 0.392232 |
| ARTIST B | ALBUM B | SONG B2 | 0 | 0 | 0.196116 |
| ... | ... | ... | 0 | 0 | 0 |
| ARTIST C | ALBUM C | SONG C | 0.143502894 | 0.04714 | 0.196116 |
| ... | ... | ... | 0 | 0 | 0 |
| ARTIST D | ALBUM D | SONG D | 0 | 0.329983 | 0.784465 |
| ... | ... | ... | 0 | 0 | 0 |
| ARTIST E | ALBUM E | SONG E | 0 | 0 | 0.392232 |

FIG. 10

| | | | VECTOR VALUES | | |
|---|---|---|---|---|---|
| | | | TERMINALS 1-1 AND 1-2 | TERMINALS 1-1 AND 1-3 | TERMINALS 1-2 AND 1-3 |
| ARTIST A | ALBUM A | SONG A | 0 | 0 | 0 |
| ⋮ | ⋮ | ⋮ | 0 | 0 | 0 |
| ⋮ | ⋮ | ⋮ | 0 | 0 | 0 |
| ARTIST B | ALBUM B | SONG B1 | 0.270591653 | 0.112573 | 0.3698 |
| ARTIST B | ALBUM B | SONG B2 | 0 | 0 | 0 |
| ⋮ | ⋮ | ⋮ | 0 | 0 | 0 |
| ⋮ | ⋮ | ⋮ | 0 | 0 | 0 |
| ARTIST C | ALBUM C | SONG C | 0.006764791 | 0.028143 | 0.009245 |
| ⋮ | ⋮ | ⋮ | 0 | 0 | 0 |
| ARTIST D | ALBUM D | SONG D | 0 | 0 | 0.25886 |
| ⋮ | ⋮ | ⋮ | 0 | 0 | 0 |
| ARTIST E | ALBUM E | SONG E | 0 | 0 | 0 |
| INNER PRODUCT (SIMILARITY COEFFICIENT) | | | 0.2773564444 | 0.140716 | 0.637905 |

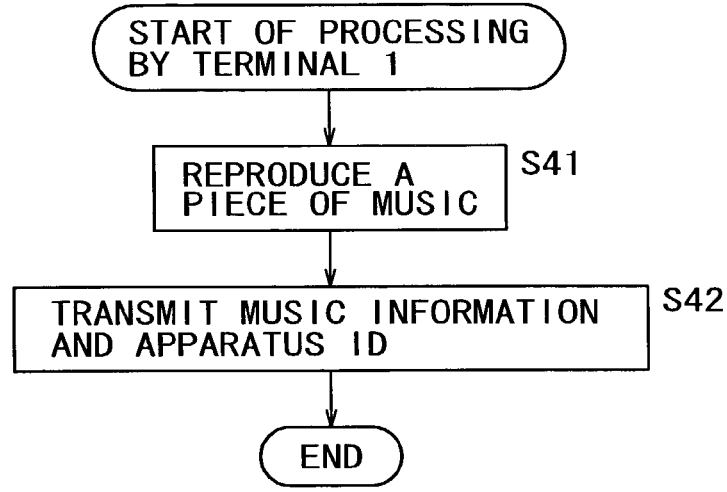
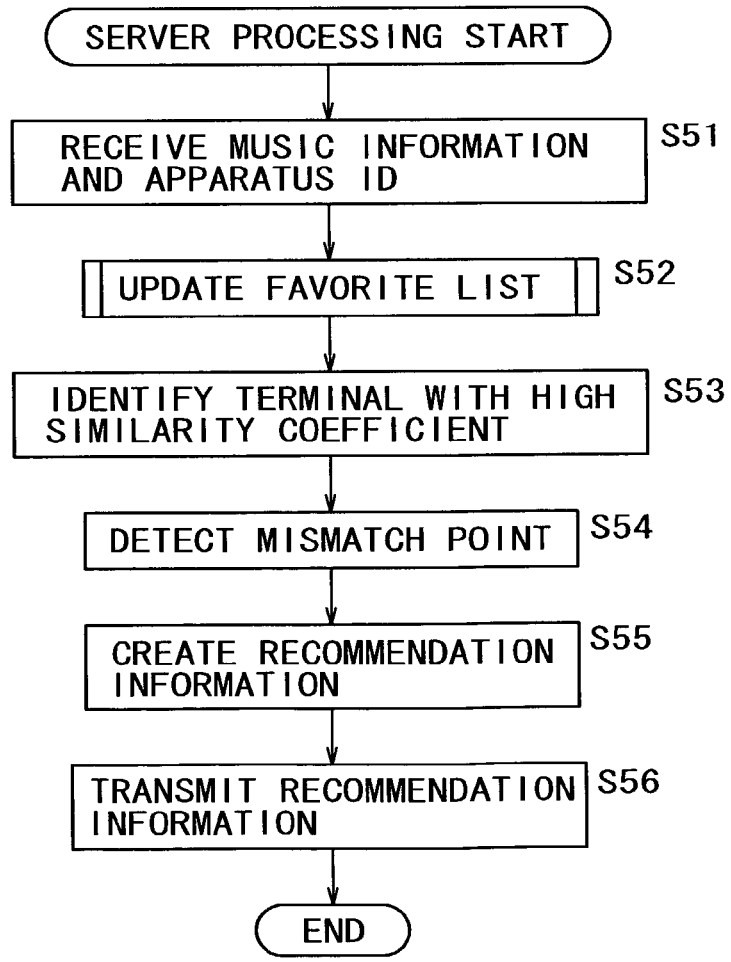

COMMUNICATION SYSTEM, COMMUNICATION APPARATUS, COMMUNICATION METHOD, RECORDING MEDIUM AND PROGRAM

BACKGROUND OF THE INVENTION

The present invention relates to a communication system, a communication apparatus, a communication method, a recording medium and a program. More particularly, the present invention relates to a communication system and a communication apparatus, which allows contents suiting the user's taste to be detected by using a simple procedure, a communication method adopted in the communication apparatus, a program for implementing the communication method and a recording medium for storing the program.

There is a service, which is rendered to the user and allows a person in charge of system management to detect contents suiting the user's taste and to inform the user of the contents by using a communication system.

In the related-art system, however, the user must transmit various kinds of information on what suits the user's taste by using its own terminal to a server managed by the person in charge of system management and must carry out other operations so that there is raised a problem that the user must follow a procedure requiring much labor.

SUMMARY OF THE INVENTION

It is thus an object of the present invention addressing the problem described above to provide a capability of detecting contents suiting the user's taste by executing a simple procedure.

According to a first aspect of the present invention, there is provided a communication system including a plurality of terminals and a server, wherein:

each of the terminals has:
utilization means for utilizing contents;
first management means for managing a utilization count of the contents and relevant information on the contents by associating the utilization count and the relevant information with the contents; and
transmission means for transmitting the utilization count, the relevant information and an apparatus ID of the terminal to the server, whereas the server has:
reception means for receiving a utilization count, relevant information and an apparatus ID from each of the terminals;
second management means for computing a similarity coefficient between pieces of contents utilized by any two of the terminals on the basis of the utilization counts, the relevant information and the apparatus IDs, and managing the computed similarity coefficients, the relevant information and the apparatus IDs by associating the computed similarity coefficients, the relevant information and the apparatus IDs with each other;
first detection means for detecting any specific terminal and an other terminal having a large computed similarity coefficient with respect to the specific terminal by referring to the similarity coefficients managed by the second management means and the apparatus IDs also managed by the second management means;
second detection means for detecting contents utilized in the other terminal detected by the first detection means but not used in the specific terminal also detected by the first detection means by referring to the apparatus IDs and the relevant information, which are managed by the second management means; and
generation means for generating information suggesting the specific terminal to utilize the contents detected by the second detection means.

In accordance with the above-described communication system, contents favorite with the user of the specific terminal can be detected by executing a simple procedure.

According to a second aspect of the present invention, there is provided a communication system including a plurality of terminals and a server, wherein:

each of the terminals has:
utilization means for utilizing contents; and
transmission means for transmitting relevant information on the contents utilized by the utilization means and an apparatus ID of the terminal to the server, whereas the server has:
reception means for receiving relevant information and an apparatus ID from each of the terminals;
first management means for updating a utilization count of the contents and managing utilization counts, relevant information and apparatus IDs by associating the utilization counts, the relevant information and the apparatus IDs with each other;
second management means for computing a similarity coefficient between pieces of contents utilized by any two of the terminals on the basis of the utilization counts, the relevant information and the apparatus IDs, and managing the computed similarity coefficients, the relevant information and the apparatus IDs by associating the computed similarity coefficients, the relevant information and the apparatus IDs with each other;
first detection means for detecting any specific terminal and an other terminal having a large computed similarity coefficient with respect to the specific terminal by referring to the similarity coefficients managed by the second management means and the apparatus IDs also managed by the second management means;
second detection means for detecting contents utilized in the other terminal detected by the first detection means but not used in the specific terminal also detected by the first detection means by referring to the apparatus IDs and the relevant information, which are managed by the second management means; and
generation means for generating information suggesting the specific terminal to utilize the contents detected by the second detection means.

In accordance with the above-described communication system, contents favorite with the user of the specific terminal can be detected by executing a simple procedure.

According to a third aspect of the present invention, there is provided a communication apparatus including:

reception means for receiving a utilization count of contents utilized in a terminal, relevant information on the contents and an apparatus ID of the terminal, from each of a plurality of terminals;
management means for computing a similarity coefficient between pieces of contents utilized by any two of the terminals on the basis of the utilization counts, the relevant information and the apparatus IDs, and managing the computed similarity coefficients, the relevant information and the apparatus IDs by associating the computed similarity coefficients, the relevant information and the apparatus IDs with each other;
first detection means for detecting any specific terminal and an other terminal having a large computed similarity coefficient with respect to the specific terminal by referring to the is similarity coefficients managed by the management means and the apparatus IDs also managed by the management means;

second detection means for detecting contents utilized in the other terminal detected by the first detection means but not used in the specific terminal also detected by the first detection means by referring to the apparatus IDs and the relevant information, which are managed by the management means; and generation means for generating information suggesting the specific terminal to utilize the contents detected by the second detection means.

Preferably, the reception means receives relevant information on contents utilized in a terminal and an apparatus ID of the terminal, from each of a plurality of terminals; and the management means updates a utilization count of the contents, manages the utilization counts, the relevant information and the apparatus IDs by associating with each other, and manages the computed similarity coefficients, the relevant information and the apparatus IDs by associating the computed similarity coefficients, the relevant information and the apparatus IDs with each other.

According to a fourth aspect of the present invention, there is provided a communication method including:

a reception step of receiving a utilization count of contents utilized in a terminal, relevant information on the contents and an apparatus ID of the terminal, from each of a plurality of terminals;

a management step of computing a similarity coefficient between pieces of contents utilized by any two of the terminals on the basis of the utilization counts, the relevant information and the apparatus IDs, and managing the computed similarity coefficients, the relevant information and the apparatus IDs by associating the computed similarity coefficients, the relevant information and the apparatus IDs with each other;

a first detection step of detecting any specific terminal and an other terminal having a large computed similarity coefficient with respect to the specific terminal by referring to the similarity coefficients managed in processing carried out at the management step and the apparatus IDs also managed in the processing carried out at the management step;

a second detection step of detecting contents utilized in the other terminal detected in processing carried out at the first detection step but not used in the specific terminal also detected in the processing carried out at the first detection step by referring to the apparatus IDs and the relevant information, which are managed in the processing carried out at the management step; and a generation step of generating information suggesting the specific terminal to utilize the contents detected in processing carried out at the second detection step.

According to a fifth aspect of the present invention, there is provided a recording medium used for storing a computer-readable program including:

a reception step of receiving a utilization count of contents utilized in a terminal, relevant information on the contents and an apparatus ID of the terminal, from each of a plurality of terminals;

a management step of computing a similarity coefficient between pieces of contents utilized by any two of the terminals on the basis of the utilization counts, the relevant information and the apparatus IDs, and managing the computed similarity coefficients, the relevant information and the apparatus IDs by associating the computed similarity coefficients, the relevant information and the apparatus IDs with each other;

a first detection step of detecting any specific terminal and an other terminal having a large computed similarity coefficient with respect to the specific terminal by referring to the similarity coefficients managed in processing carried out at the management step and the apparatus IDs also managed in the processing carried out at the management step;

a second detection step of detecting contents utilized in the other terminal detected in processing carried out at the first detection step but not used in the specific terminal also detected in the processing carried out at the first detection step by referring to the apparatus IDs and the relevant information, which are managed in the processing carried out at the management step; and a generation step of generating information suggesting the specific terminal to utilize the contents detected in processing carried out at the second detection step.

According to a sixth aspect of the present invention, there is provided a computer-executable program including:

a reception step of receiving a utilization count of contents utilized in a terminal, relevant information on the contents and an apparatus ID of the terminal, from each of a plurality of terminals;

a management step of computing a similarity coefficient between pieces of contents utilized by any two of the terminals on the basis of the utilization counts, the relevant information and the apparatus IDs, and managing the computed similarity coefficients, the relevant information and the apparatus IDs by associating the computed similarity coefficients, the relevant information and the apparatus IDs with each other;

a first detection step of detecting any specific terminal and an other terminal having a large computed similarity coefficient with respect to the specific terminal by referring to the similarity coefficients managed in processing carried out at the management step and the apparatus IDs also managed in the processing carried out at the management step;

a second detection step of detecting contents utilized in the other terminal detected in processing carried out at the first detection step but not used in the specific terminal also detected in the processing carried out at the first detection step by referring to the apparatus IDs and the relevant information, which are managed in the processing carried out at the management step; and a generation step of generating information suggesting the specific terminal to utilize the contents detected in processing carried out at the second detection step.

In accordance with the above-described communication apparatus, communication method, recording medium and program, contents favorite with the user of the specific terminal can be detected by executing a simple procedure.

BRIEF DESCRIPTION OF THE DRAWINGS

FIG. 2 is a block diagram showing a typical configuration of a terminal employed in the communication system shown in FIG. 1;

FIG. 5 is a diagram showing typical reproduction frequency information;

FIG. 9 is a diagram showing a typical favorite list;

FIG. 10 is another diagram showing a typical favorite list;

FIG. 11 shows a flowchart representing another operation of the terminal employed in the communication system shown in FIG. 1;

FIG. 12 shows a flowchart representing other operations of the server employed in the communication system shown in FIG. 1.

DETAILED DESCRIPTION OF THE PREFERRED EMBODIMENTS

Figure 1:
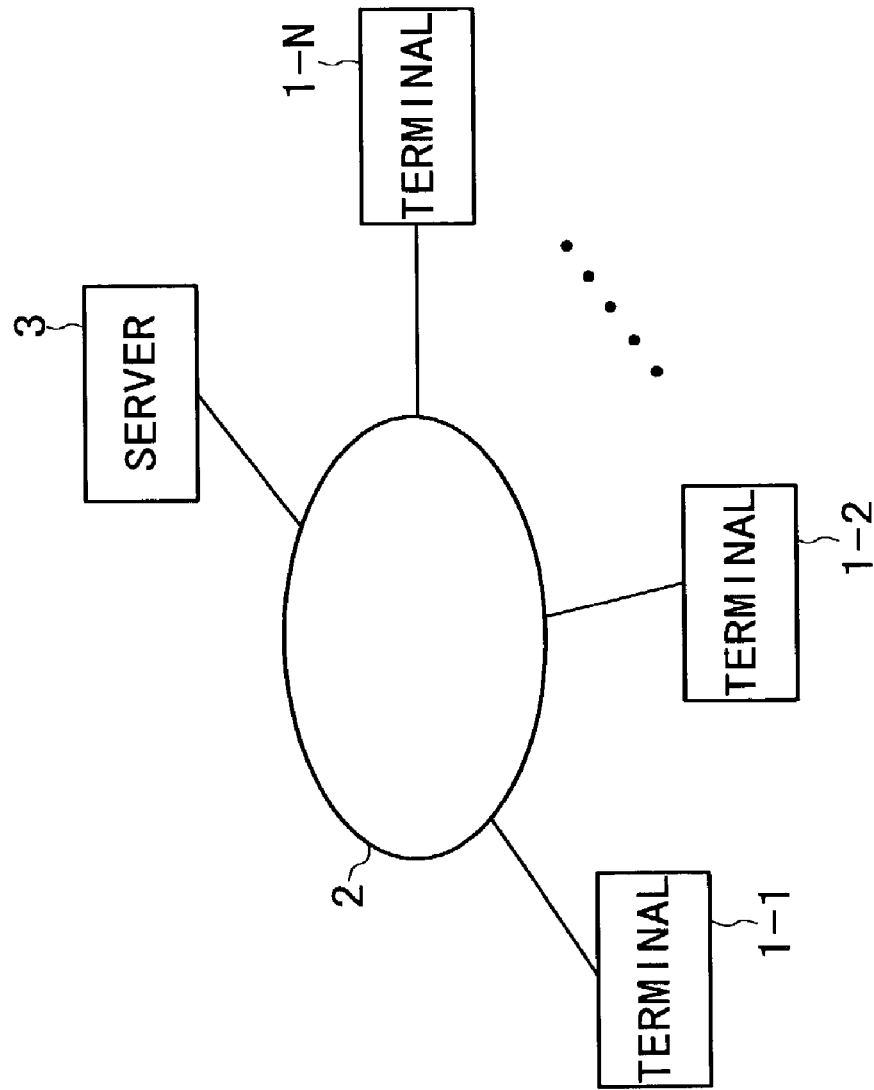
FIG. 1 is a diagram showing a typical configuration of a communication system to which the present invention is applied.

FIG. 1 is a diagram showing a typical configuration of a communication system to which the present invention is applied. N terminals 1-1 to 1-N allowed to use this communication system each have a function to utilize contents obtained through a network 2 or a piece of music acquired from a recording medium mounted on the terminal. In the following description, the terminals 1-1 to 1-N are each denoted simply by reference numeral 1 if it is not necessary to distinguish the terminals 1-1 to 1-N from each other.

The terminal 1 generates reproduction frequency information including predetermined music information on a generated piece of music and the number of times the piece of music has been reproduced. In the following description, the number of times a piece of music has been reproduced is also referred to as a reproduction count of the piece of music. The reproduction frequency information will be described more later. The music information is a collection of pieces of information such as the song title, an album title and artist names for each piece of music. It is to be noted that, in the following description, each of the pieces of information such as a song title, which compose the music information, is referred to as a piece of individual data.

The terminal 1 transmits reproduction frequency information generated thereby and its own apparatus ID to the server 3 by way of the network 2 with a predetermined timing.

The server 3 computes a similarity coefficient between pieces of music reproduced by any two terminals 1 on the basis of apparatus IDs and reproduction frequency information, which are received from the terminals 1-1 to 1-N. The server 3 puts the similarity coefficients on a favorite list to be described later by associating each of the similarity coefficients with the two terminals' apparatus IDs and reproduction frequency information for the purpose of managing the similarity coefficients.

In particular, when the server 3 receives reproduction frequency information and an apparatus ID with a predetermined timing from a specific terminal 1, which is referred to hereafter as a terminal 1-X, the server computes a similarity coefficient between pieces of music reproduced by the terminal 1-X and any other terminal 1 on the basis of the received reproduction frequency information and the received apparatus ID. The server 3 then puts the computed similarity coefficient on the favorite list by associating the similarity coefficient with the apparatus ID and the reproduction frequency information, which have been received from the terminal 1-X. Then, the server 3 finds at least another terminal 1 reproducing pieces of music similar to pieces of music reproduced by the terminal 1-X, and identifies pieces of music reproduced by the terminal 1 but not reproduced yet by the terminal 1-X. In the following description, another terminal 1 reproducing pieces of music similar to those reproduced by the terminal 1-X is also referred to as a terminal 1 having a large similarity coefficient with respect to the terminal 1-X.

A particular piece of music reproduced by (or listened to at) the detected terminal 1 is the to be similar to another piece of music reproduced by (or listened to at) the terminal 1-X if both the pieces of music are of the same genre, sung by the same artist and/or have other things in common. Thus, if the particular piece of music is not reproduced by (or listened to at) the detected terminal 1-X even though reproduced by (or listened to at) the detected terminal 1, the particular piece of music can be expected to be a favorite with the user of the terminal 1-X. That is to say, in this communication system, with a user simply reproducing a piece of music at a terminal 1, it is possible to detect another piece of music that has not been listened to by the user but is expected to become a favorite with the user.

The server 3 then transmits information on the particular piece of music to the terminal 1-X as recommendation information. The user of the terminal 1-X refers to the recommendation information received by the terminal 1-X typically to determine what contents to be purchased next.

In this communication system, transaction processing between a terminal 1 and the server 3 is based on the apparatus ID of the terminal 1. That is to say, since it is not necessary to identify a user, a plurality of users are allowed to use a terminal 1. In addition, since personal information on a user of a terminal 1 is not transmitted from the terminal 1 to the server 3, personal information on a user is not leaked because the user utilizes the communication system.

FIG. 2 is a block diagram showing a typical configuration of the terminal 1. An LSI (Large Scale Integration) 20 includes an embedded CPU 21 for controlling the whole terminal 1. The CPU 21 is connected to a ROM 22, a RAM 23, a DMA controller 24, a DSP (Digital Signal Processor) 25, a buffer 26, an LCD interface (I/F) 27, a serial interface (I/F) 28 and other interfaces 29, 30 and 31 by a bus 32.

The ROM 22 is used for storing programs, an apparatus ID, an encryption key and other data. The programs are executed by the CPU 21 to carry out a variety of functions of the terminal 1. The RAM 23 is used for temporarily storing predetermined data and a program being executed by the CPU 21. The predetermined data is required by the CPU 21 in execution of various kinds of processing. The DMA controller 24 is used for exchanging data with a flash memory 37 by way of the buffer 26 and the other interface 29 and exchanging data with a USB controller 35 by way of the serial interface 28.

The DSP 25 decodes music data stored in the flash memory 37. In addition, the DSP 25 has a DES engine for encryption/decryption of music data by using an encryption key. Audio data obtained as a result of a decoding process carried out by the DSP 25 is output to head phones by way of the further interface 30, a DAC 38 and an amplifier (AMP) 39. The buffer 26 is used for temporarily buffering data, transfers of which are controlled by the DMA controller 24.

The LCD interface 27 is connected to an LCD 34 through an LCD driver 33. The serial interface 28 is connected to a USB connector 36 through the USB controller 35. The USB controller 35 controls communications of data with the server 3 connected to the terminal 1 by the USB connector 36.

The flash memory 37 connected to the other interface 29 is used for storing, among others, music data and reproduction frequency information. The further interface 30 is connected to the amplifier 39 through the DAC 38. An operation unit 40 connected to the still further interface 31 includes a variety of buttons and the like. A power-supply unit 41 supplies power to a variety of components.

Figure 3:
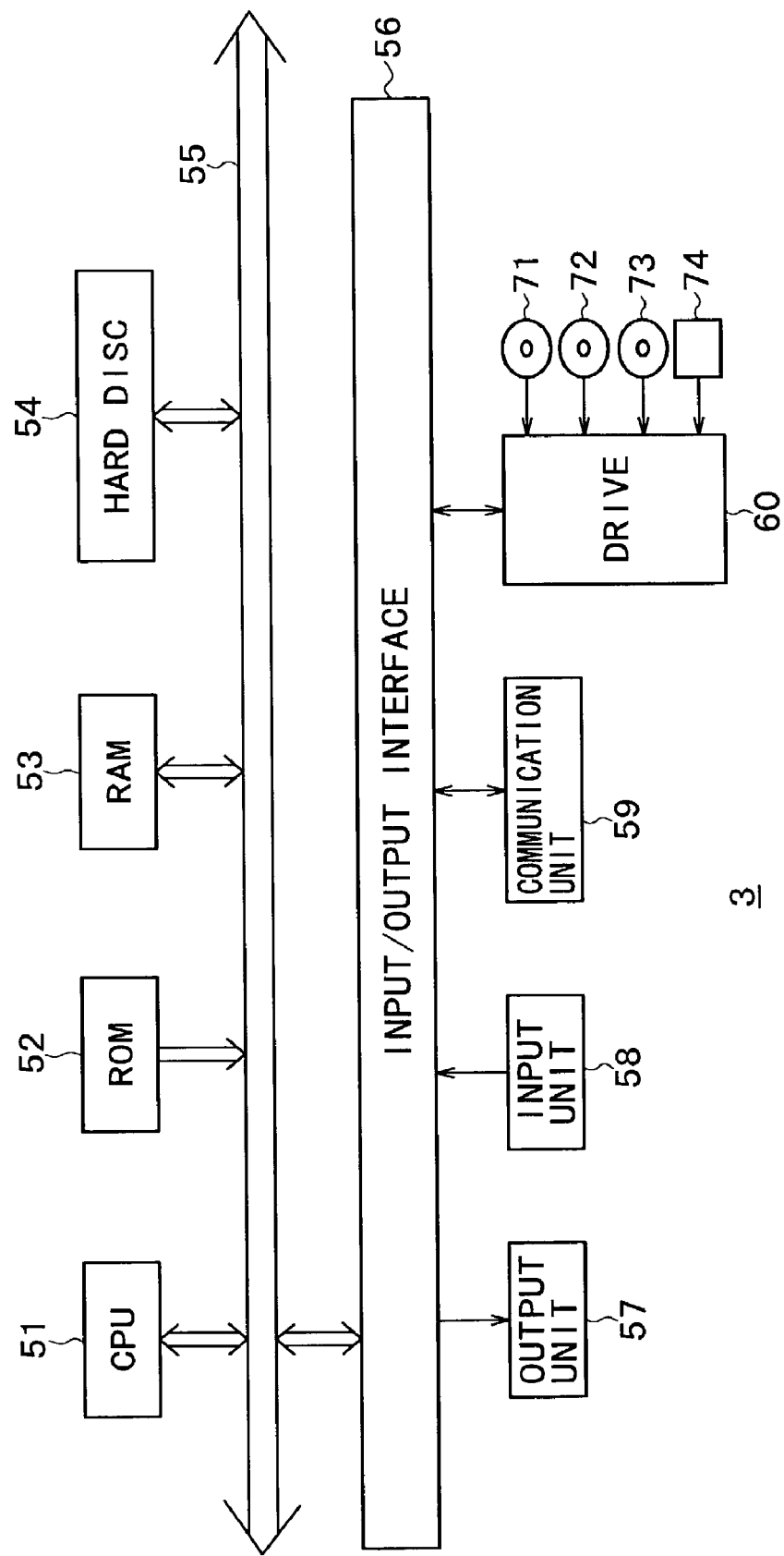
FIG. 3 is a block diagram showing a typical configuration of a server employed in the communication system shown in FIG. 1.

FIG. 3 is a block diagram showing a typical configuration of the server 3. A CPU 51 is connected to an input/output interface 56 by a bus 55. When the user enters a command via an input unit 58 including a keyboard and a mouse to the input/output interface 56 by operating the keyboard or the mouse, the CPU 51 loads a program into a RAM 53 for execution from typically a ROM 52, a hard disc 54 or a recording medium mounted on a drive 60. Examples of the recording medium mounted on the drive 60 are a magnetic disc 71, an optical disc 72, a magneto-optical disc 73 and a semiconductor memory 74. In addition, if necessary, the CPU 51 outputs results of processing to an output unit 57 including an LCD by way of the input/output interface 56.

Figure 4:
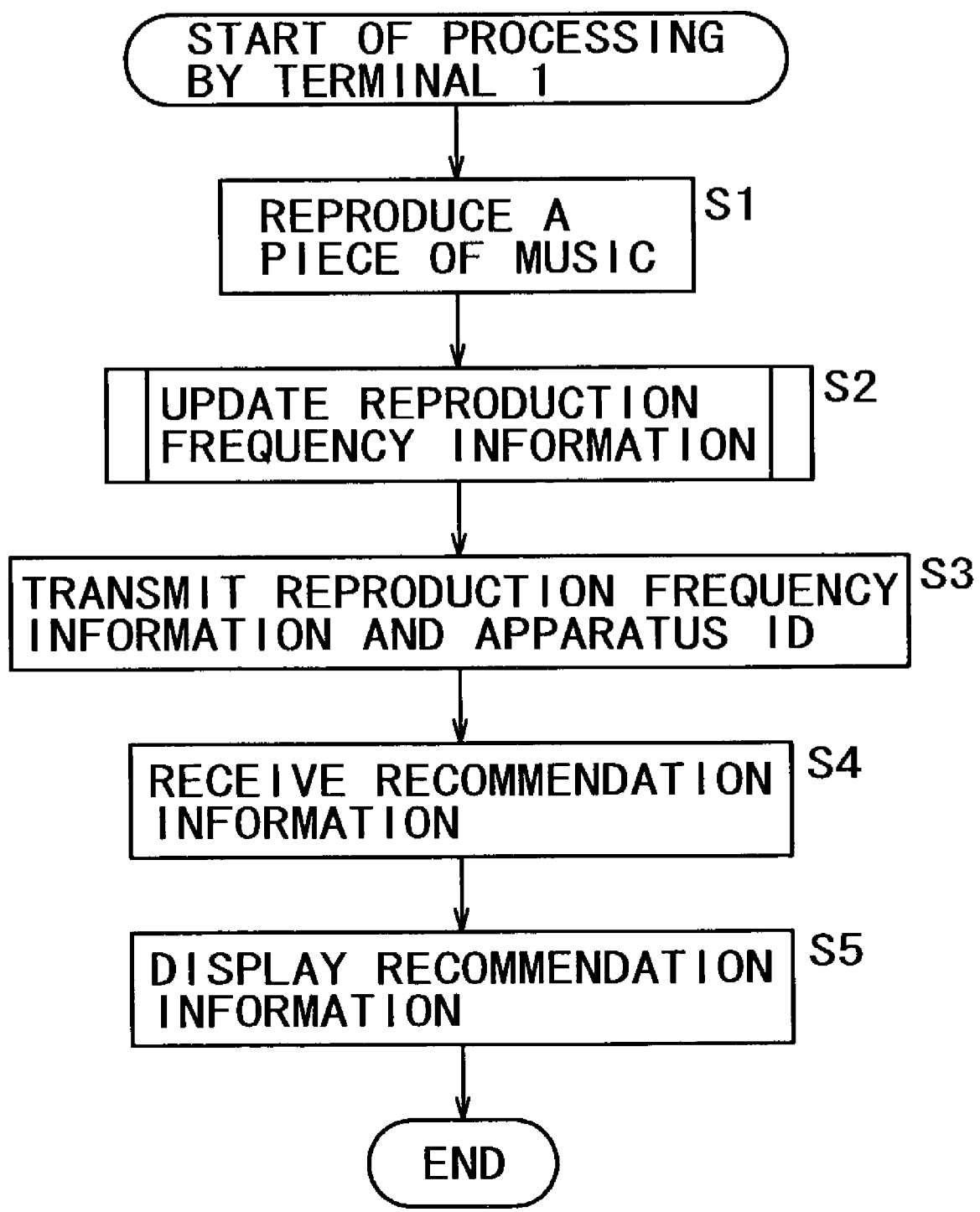
FIG. 4 shows a flowchart representing the operation of the terminal employed in the communication system shown in FIG. 1.

Next, the operation of the terminal 1 is explained by referring to a flowchart shown in FIG. 4. It is to be noted that, in the explanation, the terminal 1-1 is taken as an example.

As shown in the figure, the flowchart begins with a step S1 at which a piece of music requested by the user is reproduced. Then, at the next step S2, the CPU 21 employed in the terminal 1-1 updates the reproduction frequency information. FIG. 5 is a diagram showing an example of the reproduction frequency information.

The typical reproduction frequency information is a collection of pieces of music information. Provided for a piece of music, each piece of music information includes individual data and a reproduction count (COUNT). The individual data includes an artist name (ARTIST), a song title (TITLE) and an album title (ALBUMTITLE). The reproduction count is the number of times the piece of music has been reproduced so far. It is to be noted that, in the typical reproduction frequency information, only three pieces of music information for three pieces of music having largest reproduction counts are shown.

Figure 6:
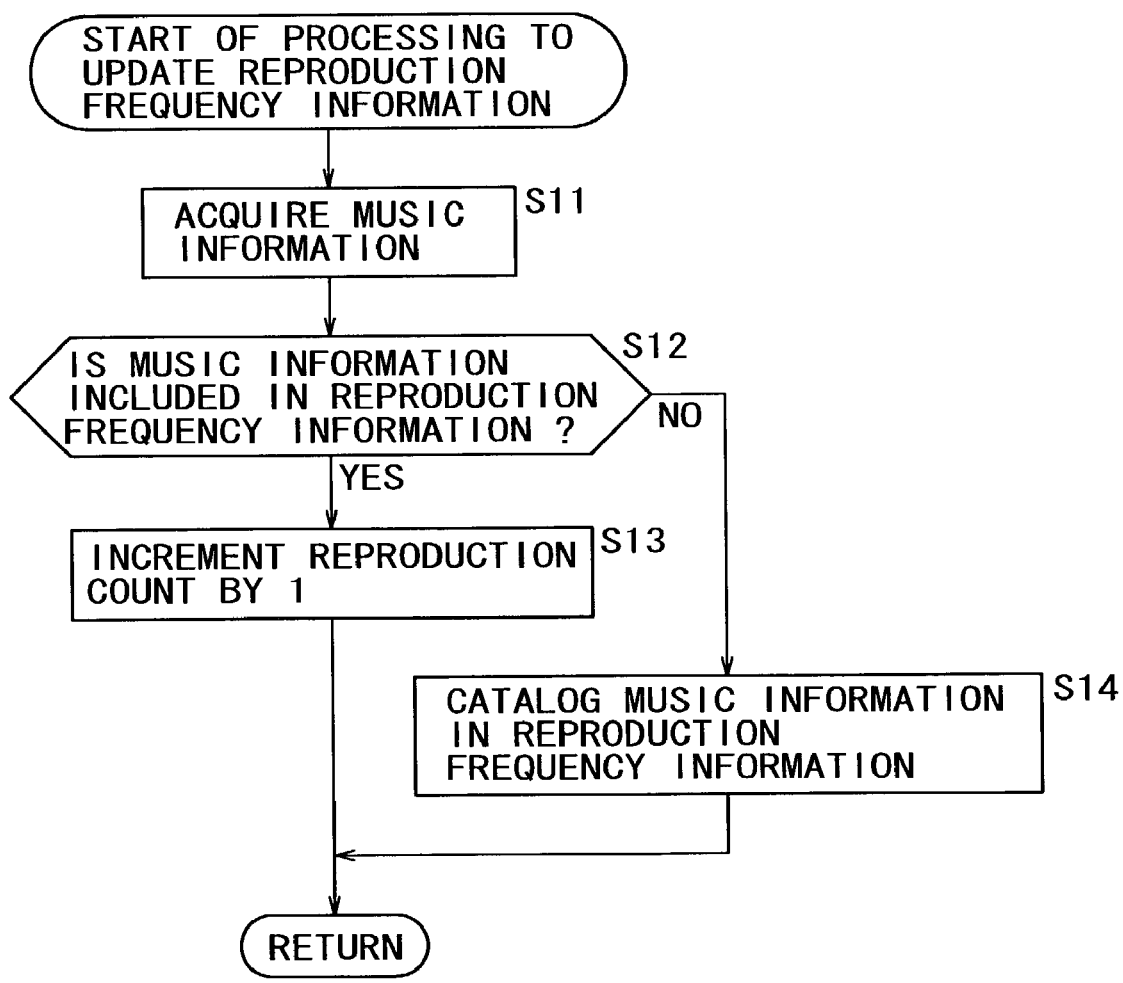
FIG. 6 shows a flowchart representing details of processing carried out at a step S2 of the flowchart shown in FIG. 4.

Details of the processing carried out at the step S2 are represented by a flowchart shown in FIG. 6. As shown in the figure, the flowchart begins with a step S11 at which the CPU 21 acquires music information typically from the operation unit 40 when the user operates the operation unit 40 to enter the music information. As an alternative, the CPU 21 acquires music information from TOC information recorded on a reproduction terminal or a reproduction medium. As another alternative, the CPU 21 acquires music information from a CDDB based on TOC information of a CD. As a further alternative, the CPU 21 acquires music information by using path information of a file and/or ID 3 tag information included in an MP3 file.

Then, at the next step S12, the CPU 21 forms a judgment as to whether or not the acquired music information is already included in the reproduction frequency information. If the outcome of the judgment indicates that the acquired music information is already included in the reproduction frequency information, the flow of the processing goes on to a step S13 at which the reproduction count associated with the music information is incremented by 1.

If the outcome of the judgment formed at the step S12 indicates that the music information acquired at the step S11 is not included in the reproduction frequency information yet, on the other hand, the flow of the processing goes on to a step S14 at which the acquired music information and a reproduction count of 1 are cataloged in the reproduction frequency information as a new piece of music information.

It is to be noted that, while the reproduction frequency information may include all pieces of music information having a reproduction count of at least 1, least recently updated pieces of music information can be erased from a recording medium with a limited storage 1capacity. An example of such a recording medium is the flash memory 37 employed in the terminal 1 to be used for storing the reproduction frequency information. In order to form a judgment as to whether or not a piece of music information is to be deleted from the recording medium, the music information includes a tag (LASTUPDATE) for recording a date on which the music information is updated last as shown in FIG. 5. A piece of music information with a tag date ahead of the present time by at least a predetermined number of days is deleted from the recording medium. In this way, only most recent favorites with the user of the terminal 1 are cataloged in the terminal 1.

As described above, after the reproduction frequency information is updated by incrementing the reproduction count at the step S13 or cataloging a new piece of music information at the step S14, the processing to update the reproduction frequency information is ended, and the flow of the processing goes on to a step S3 of the flowchart shown in FIG. 4.

At the step S3, the CPU 21 transmits the reproduction frequency information updated at the step S2 and the apparatus ID of the terminal 1-1 to the server 3 by way of the serial interface 28, the USB controller 35 and the USB connector 36. In the case of this embodiment, the reproduction frequency information transmitted to the server 3 includes only three pieces of music information for three pieces of music having largest reproduction counts as shown in FIG. 5. It is to be noted, however, that the reproduction frequency information transmitted to the server 3 at the step S3 may include pieces of music information, which are selected by considering the last updating dates described above.

Then, at the next step S4, the CPU 21 receives recommendation information from the server 3 through the USB connector 36. The recommendation information is created by the server 3 on the basis of the reproduction frequency information and the apparatus ID, which were transmitted to the server 3 at the step S3.

Then, at the next step S5, the CPU 21 displays the received recommendation information on the LCD 34 through the LCD driver 33.

Finally, the processing is ended.

Figure 7:
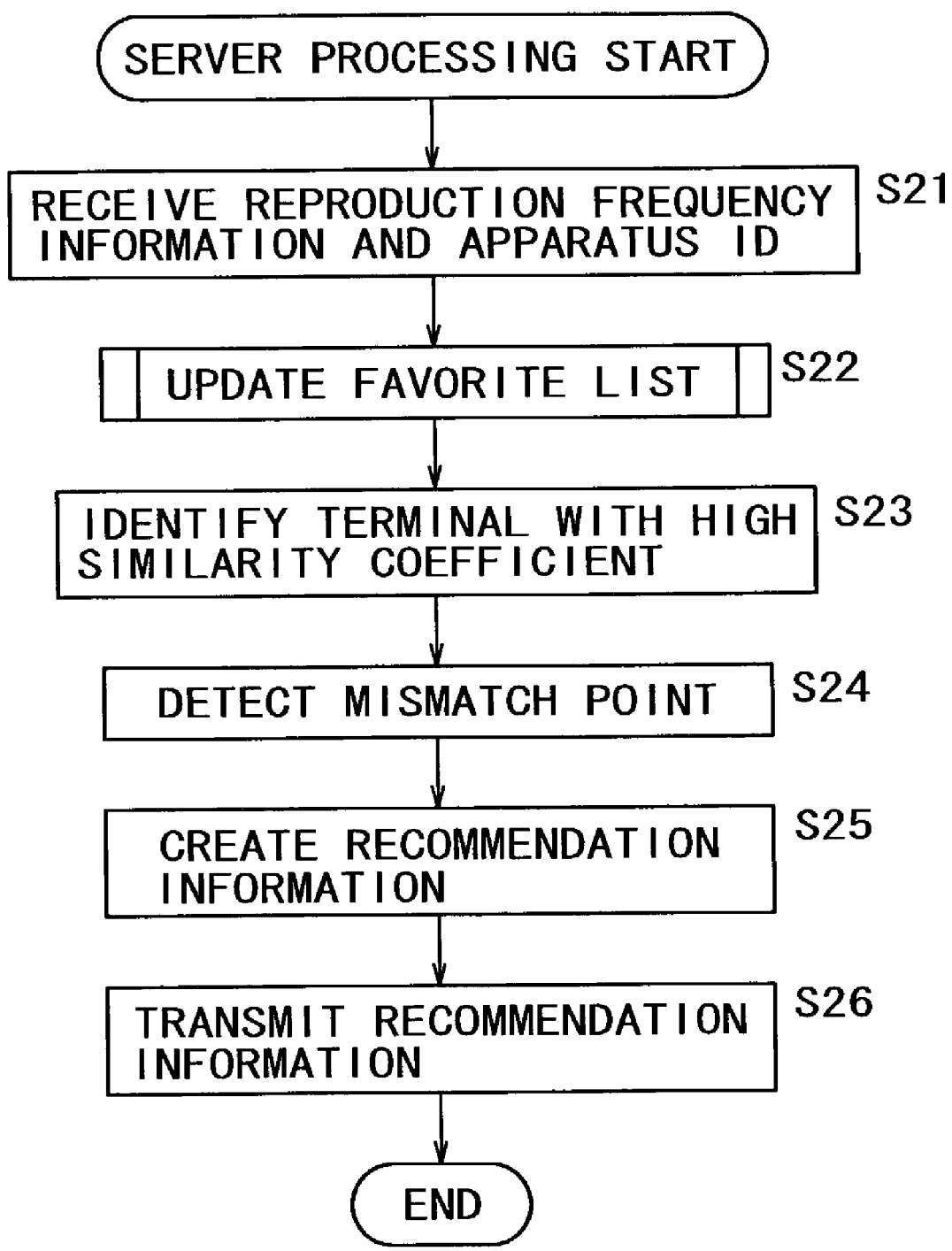
FIG. 7 shows a flowchart representing the operation of the server employed in the communication system shown in FIG. 1.

Next, the operation of the server 3 is explained by referring to a flowchart shown in FIG. 7.

As shown in the figure, the flowchart begins with a step S21 at which the CPU 51 employed in the server 3 receives the reproduction frequency information and the apparatus ID, which are transmitted by the terminal 1-1 at the step S3 of the flowchart shown in FIG. 4 by way of the communication unit 59. For details of the reproduction frequency information, refer to FIG. 5.

Then, at the next step S22, the CPU 51 updates the favorite list on the basis of the reproduction frequency information and the apparatus ID, which have been received from the terminal 1-1. Details of a process to update the favorite list are represented by a flowchart shown in FIG. 8.

As shown in the figure, the flowchart begins with a step S31 at which the CPU 51 fetches a piece of music information from the reproduction frequency information received at the step S21. The reproduction frequency information shown in FIG. 5 includes three pieces of music information.

Then, at the next step S32, the CPU 51 selects a highly reliable piece of individual data included in the selected piece of music information fetched at the step S31. That is to say, the CPU 51 selects one of an artist name (ARTIST), a song title (TITLE) and an album title (ALBUMTITLE), which compose the selected piece of music information. For example, a piece of individual data entered by the user by operating the operation unit 40 is prone to an operational error or the like. Thus, a piece of individual data acquired from the TOC information is more reliable. As described above, the individual data is acquired at the step S11 of the flowchart shown in FIG. 6 and a piece of music information including the individual data is cataloged onto the reproduction frequency information at the step S14 of the same flowchart.

Subsequently, at the step S33, the CPU 51 finds a music ID associated with the piece of individual data selected at the step S32. In the server 3 of the communication system, music IDs are managed by associating each of the music IDs with predetermined information, that is, the individual data such as a song title or an artist name. Thus, the CPU 51 is capable of finding a music ID managed by being associated with the piece of individual data selected at the step S32.

Then, at the next step S34, the CPU 51 forms a judgment as to whether or not there is only one music ID found at the step S33. If the outcome of the judgment indicates that there are a plurality of music IDs found at the step S33, the flow of the processing goes on to a step S35. An example of the case in which the processing goes on to the step S35 is a case in which the individual data selected at the step S32 is an artist name and there are a plurality of managed music IDs found at the step S33 for the artist name.

At the step S35, the CPU 51 forms a judgment as to whether or not a piece of individual data remains in the piece of music information fetched at the step S31 as a piece of individual data selectable at the step S32. If the outcome of the judgment indicates that a piece of individual data remains as a piece of individual data selectable at the step S32, the flow of the processing goes back to the step S32 to repeat the processing described above.

It is to be noted that, this time, at the step S33, a music ID is detected for individual data newly selected at the step S32 among the music IDs selected at the step S33 in the preceding loop iteration. As described above, assume that, in the preceding loop iteration, the individual data selected at the step S32 was an artist name and there were a plurality of managed music IDs found at the step S33 for the artist name. This time, in the current loop iteration, the individual data selected at the step S32 is an album title and a music ID is detected for the album title among the music IDs detected earlier for the artist name.

Thus, the number of candidate music IDs to be screened at the step S33 decreases each time the loop from the step S32 to the step S35 is executed. The loop from the step S32 to the step S35 is executed repeatedly till, finally, the outcome of the judgment formed at the step S34 indicates that there is only one music ID found at the step S33 or the outcome of the judgment formed at the step S35 indicates that no piece of individual data remains as a piece of individual data selectable at the step S32.

As the outcome of the judgment formed at the step S35 indicates that all pieces of individual data of the piece of music information fetched at the step S31, that is, only one music ID could not be found finally, the flow of the processing goes on to a step S36 at which the CPU 51 forms a judgment as to whether or not the piece of music information fetched at the step S31 is reliable. If the piece of music information fetched at the step S31 includes a famous artist name or if the transmission origin of the reproduction frequency information including the music information is a terminal 1 using the communication system frequently, for example, the piece of music information is judged to be reliable.

If the outcome of the judgment formed at the step S36 indicates that the piece of music information fetched at the step S31 is reliable or if the outcome of the judgment formed at the step S34 indicates that there is finally only one music ID found at the step S33, the flow of the processing goes on to a step S37 at which the CPU 51 catalogs the pieces of individual data included in the music information fetched at the step S31 and a vector value on the favorite list's column for the terminal 1-1 to update the list. The vector value is a value obtained as a result of normalization of the reproduction count included in the music information.

Then, at the next step S38, the CPU 51 forms a judgment as to whether or not the reproduction frequency information received at the step S21 of the flowchart shown in FIG. 7 still includes a piece of music information not fetched at the step S31. If the outcome of the judgment indicates that the reproduction frequency information still includes such a piece of music information, the flow of the processing goes back to the step S31 to repeat the processing described above.

FIG. 9 is a diagram showing a typical favorite list. The favorite list includes vector values cataloged on the list at the step S37 for songs A, B1 and C. As described above, a vector value for a song is a value obtained as a result of normalization of the song's reproduction count included in the reproduction frequency information shown in FIG. 5. The vector values or the normalized values are computed as follows:

Normalized value of song A:

$$0.947119104 = 33 / \sqrt{(33 \times 33 + 10 \times 10 + 5 \times 5)}$$

Normalized value of song B1:

$$0.287005789 = 10 / \sqrt{(33 \times 33 + 10 \times 10 + 5 \times 5)}$$

Normalized value of song C:

$$0.143502894 = 5 / \sqrt{(33 \times 33 + 10 \times 10 + 5 \times 5)}$$

If the outcome of the judgment formed at the step S38 indicates that the reproduction frequency information no longer includes a piece of music information not fetched at the step S31, on the other hand, the flow of the processing goes on to a step S23 of the flowchart shown in FIG. 7.

At the step S23, the CPU 51 computes an inner product between any two terminals 1 for each piece of music by multiplying the vector values of the terminals 1 for the pieces of music. FIG. 10 is a table showing vector values between the terminals 1-1 and 1-2, between the terminals 1-1 and 1-3 and between the terminals 1-2 and 1-3. For example, an inner product between the terminals 1-1 and 1-2 for song p is found as follows:

Inner product between the terminals 1-1 and 1-2 for song p=Σ(vector value of terminal 1-1 for song p×vector value of terminal 1-2 for song p)

where notation p is a name given to the song as shown on the favorite list.

The calculated inner product between two terminals 1 for a piece of music after all represents a coefficient of similarity. That is to say, the greater the value of an inner product, the more frequently the piece of similar music is reproduced (listened to) in both the terminals 1. For this reason, an inner product is referred to as a coefficient of similarity. Strictly speaking, the sum of inner products is referred to as a coefficient of similarity as shown in FIG. 10.

The CPU 51 also identifies a terminal 1 that has a highest coefficient of similarity with respect to the terminal 1-1. In the case of the example shown in FIG. 10, for instance, the coefficient of similarity between the terminal 1-1 and the terminal 1-2 is greater than the coefficient of similarity between the terminal 1-1 and the terminal 1-3. Thus, in this case, the CPU 51 identifies the terminal 1-2 as a terminal 1 having a highest coefficient of similarity with respect to the terminal 1-1.

Then, at the next step S24, the CPU 51 searches the favorite list's column assigned to the terminal 1-2 identified at the step S23 for any piece of music information having a vector value greater than 0. The favorite list is shown in FIG. 9. As described above, a piece of music information comprises a song title, an album title and an artist name. Then, the CPU 51 searches the pieces of music information found in the search to have a vector value greater than 0 for a piece of music information not included on the column assigned to the terminal 1-1.

In the case of the typical favorite list shown in FIG. 9, the pieces of music information having a vector value greater than 0 for the terminal 1-2 are pieces of music information including songs B1, C and D respectively and only the piece of music information including song D is not included in the column assigned to the terminal 1-1, which includes only pieces of music information including songs A, B1 and C respectively.

Then, at the next step S25, the CPU 51 employed in the server 3 composes recommendation information based on the detection result obtained at the step S24, and transmits the recommendation information to the terminal 1-1 at the following step S26.

After the transmission of the recommendation information to the terminal 1-1, the processing is ended.

It is to be noted that, in the process to identify a terminal 1 that has a high coefficient of similarity with respect to the terminal 1-1 at the step S23, a similarity-coefficient threshold value can be used as a criterion. That is to say, the CPU 51 only identifies terminals 1 that each have a coefficient of similarity greater than the similarity-coefficient threshold value.

By the same token, if more than one piece of music information not included in the favorite list's column assigned to the terminal 1-1 are found at the step S24, a vector-value threshold value can be used. In this case, the CPU 51 searches the pieces of music information not included in the favorite's column assigned to the terminal 1-1 for ones each having a vector value greater than the vector-value threshold value. As an alternative, the CPU 51 searches the pieces of music information not included in the favorite's column assigned to the terminal 1-1 for ones having large vector values starting from the top.

Figure 13:
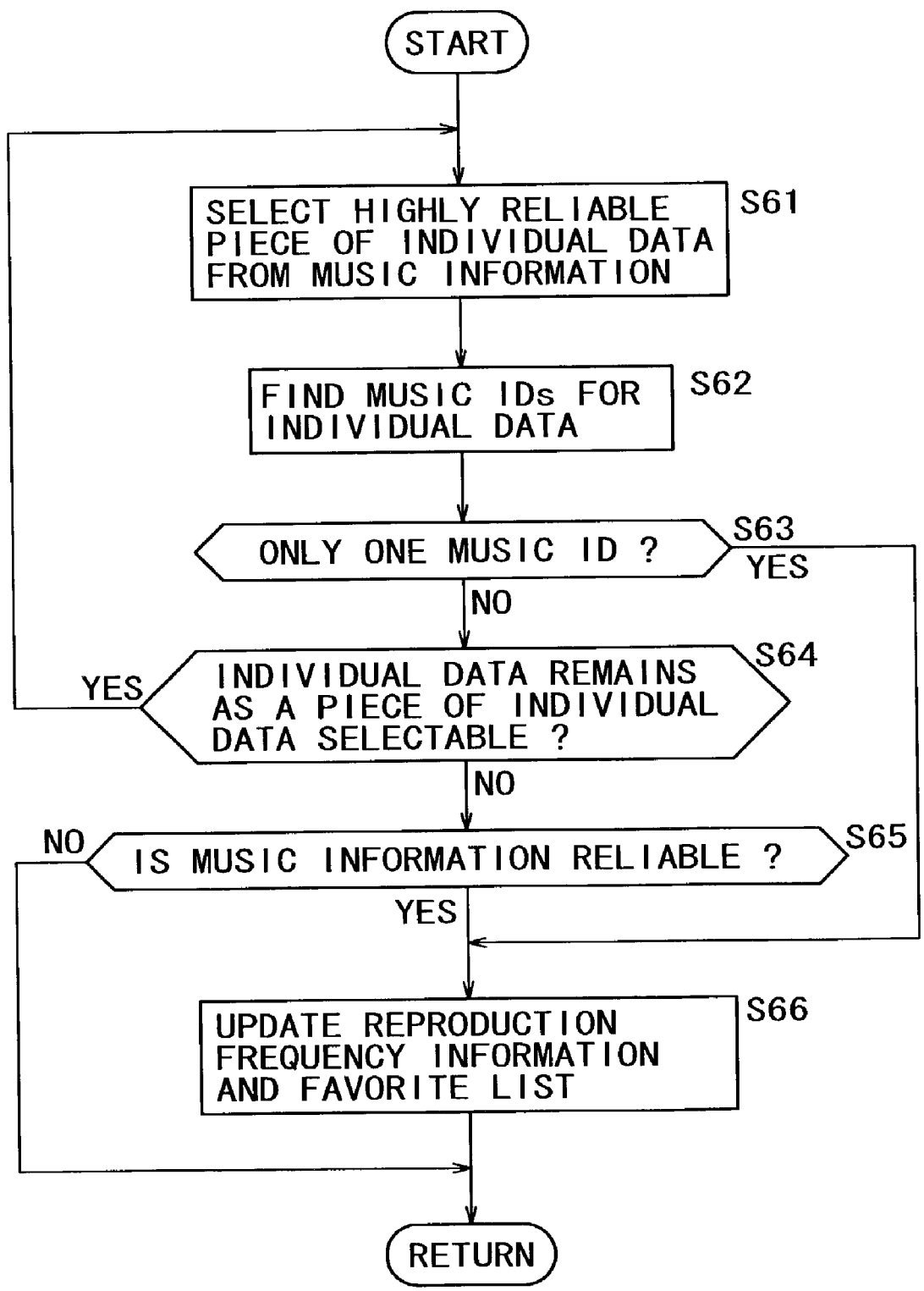
FIG. 13 shows a flowchart representing details of processing carried out at a step S52 of the flowchart shown in FIG. 12.

Next, other operations of the terminal 1 and the server 3 are explained by referring to flowcharts shown in FIGS. 11 to 13.

First of all, the other operation of the terminal 1 is explained by referring to the flowchart shown in FIG. 11. Also in this case, the terminal 1-1 is taken as an example. The operation of the terminal 1 has been explained earlier by referring to the flowchart shown in FIG. 4.

As shown in the figure, the flowchart begins with a step S41 at which a piece of music specified by the user is reproduced. Then, at the next step S42, the CPU 21 employed in the terminal 1-1 acquires music information typically from the operation unit 40 when the user operates the operation unit 40 to enter the music information or acquires music information from TOC information. Then, the CPU 21 transmits the apparatus ID of the terminal 1-1 to the server 3 by way of components such as the serial interface 28 along with music information and a reproduction count of the reproduced piece of music. The step S42 is different from the step S3 of the flowchart shown in FIG. 4 in that, at the step S3, the whole reproduction frequency information including all pieces of music information is transmitted while, at the step S42, only a particular piece of music information for the piece of music reproduced at the step S41 is transmitted.

After the transmission of the apparatus ID and the music information, the processing is ended.

Next, the other operations carried out by the server 3 in response to the operation represented by the flowchart shown in FIG. 11 are explained by referring to the flowcharts shown in FIGS. 12 and 13. It is to be noted that, by referring to the flowcharts shown in FIGS. 7 and 8, an earlier description has explained the operation carried out by the server 3 in response to the operation carried out by the terminal 1 as shown by the flowchart of FIG. 4. FIGS. 12 and 13 thus correspond to FIGS. 7 and 8 respectively.

As shown in FIG. 12, the flowchart begins with a step S51 at which the CPU 51 employed in the server 3 receives the apparatus ID as well as the music information including the individual data and a reproduction count from the terminal 1-1. Then, at the next step S52, the CPU 51 reads out reproduction frequency information associated with the received apparatus ID from the hard disc 54, updates the reproduction frequency information's music information in accordance with the received music information and stores back the updated reproduction frequency information into the hard disc 54. The CPU 51 also updates the favorite list in accordance with the received music information. As is obvious from the flowchart shown in FIG. 6, the terminal 1 manages reproduction frequency information. It is also clear from the step S52 that the reproduction frequency information is also managed by the server 3. However, the server 3 manages several pieces of reproduction frequency information, which are each associated with a music ID.

It is to be noted that, while a piece of reproduction frequency information may include all pieces of music information having a reproduction count of at least 1, least recently updated pieces of music information can be erased from the reproduction frequency information as described above so that the server 3 is capable of managing several pieces of reproduction frequency information with a limited processing power and a recording medium's limited storage capacity, which are available in the server 3. In order to form a judgment as to whether or not a piece of music information is to be deleted from reproduction frequency information stored in the recording medium, the individual data includes a tag for recording a date on which the individual data is updated last as shown in FIG. 5. A piece of music information with a tag date ahead of the present time by at least a predetermined number of days is deleted from the reproduction frequency information stored in the recording medium. In this way, only most recent favorites with the user of the terminal 1 are cataloged in the terminal 1 and the server 3 needs to manage only pieces of such less reproduction frequency information.

Details of the step S52 are represented by the flowchart shown in FIG. 13.

Figure 8:
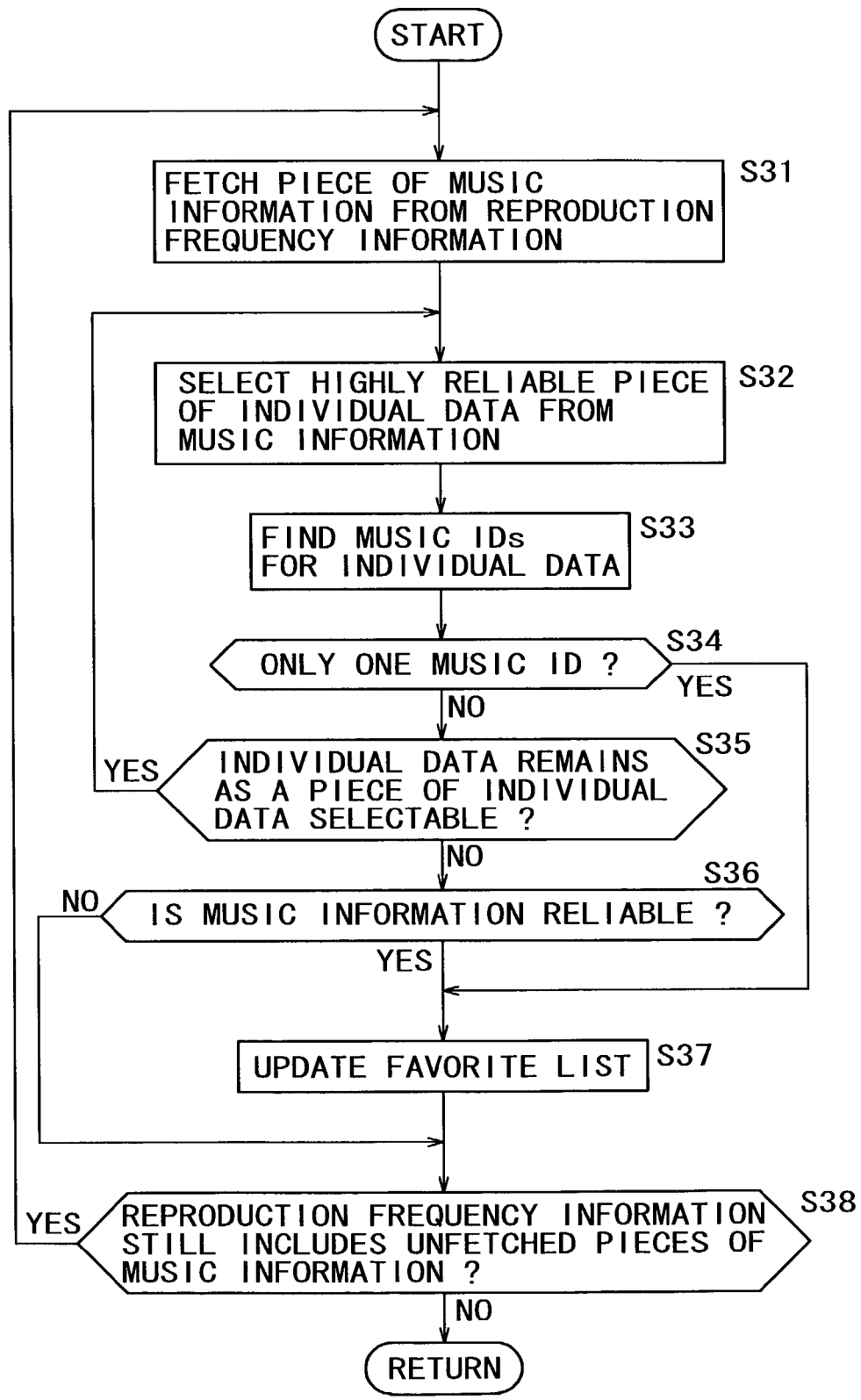
FIG. 8 shows a flowchart representing details of processing carried out at a step S22 of the flowchart shown in FIG. 7.

Since pieces of processing carried out at the steps S61 to S65 are the same as those carried out at the steps S32 to S36 of the flowchart shown in FIG. 8, their explanation is not repeated.

At a step S66, the CPU 51 employed in the server 3 updates the reproduction frequency information. If the outcome of the judgment formed at the step S63 is YES, indicating that there is only one music ID, causing steps S64 and S65 to be skipped, for example, the reproduction frequency information's reproduction count associated with the music ID is incremented by 1.

If the outcome of the judgment formed at the step S64 is NO, indicating that only one music ID could not be found finally, on the other hand, the CPU 51 assigns a new ID to the music information received at the step 551 of the flowchart shown in FIG. 12 and catalogs the music information in the reproduction frequency information by associating the music information with the new music information at a step S66.

In addition, the CPU 51 also updates the favorite list in the same way as the step S37 of the flowchart shown in FIG. 8. Then, the flow of the processing goes on to a step S53 of the flowchart shown in FIG. 12.

Since pieces of processing carried out at the steps S53 to S56 are the same as those carried out at the steps S23 to S26 of the flowchart shown in FIG. 7, their explanation is not repeated.

It is to be noted that, in the embodiments described above, after a piece of music specified by the user is reproduced in the terminal 1, reproduction frequency information or music information for the piece of music is transmitted by the terminal 1 to the server 3 as shown in the flowchart of FIG. 4 or 11 respectively. However, the transmission timing is not limited to that adopted by the embodiment. For example, the user may carry out an operation to transmit reproduction frequency information accumulated so far or music information for a piece of music reproduced last. In this way, the user is capable of intentionally making a request for recommendation information.

The series of processes described above can be carried out by hardware or software. If the series of processes is carried out by software, programs composing the software can be installed in a computer. By having the computer execute a variety of programs, the computer can be driven to carry out functions of the terminal 1 or the server 3.

It is to be noted that, in this specification, steps prescribing a program stored in a recording medium can of course be pieces of processing, which are carried out in a prescribed order along the time axis, but do not have to be executed sequentially. That is to say, the steps can be pieces of processing, which are carried out concurrently or individually.

In addition, the word 'system' used in this specification mean the whole system including a plurality of apparatuses.

What is claimed is:

1. A communication system comprising a plurality of terminals and a server, wherein:
    each of the plurality of terminals is accessible and utilizable by a plurality of users, wherein each of the plurality of terminals comprises:
        utilization means for utilizing contents;
        first management means for managing a utilization count of the contents and relevant information on the contents by associating said utilization count and said relevant information with the contents, said utilization count indicating a frequency and/or a number of times respective contents have been utilized by the utilization means; and
        transmission means for transmitting the utilization count, the relevant information and an apparatus ID identifying said respective terminal to said server, wherein
    said server has:
        reception means for receiving said utilization count, said relevant information and said apparatus ID associated with respective terminals;
        second management means for computing a similarity coefficient between pieces of contents utilized by any two of said terminals on the basis of utilization counts, said relevant information and said apparatus IDs, and managing computed similarity coefficients, said relevant information and said apparatus IDs by associating said computed similarity coefficients, said relevant information and said apparatus IDs with each other;
        first detection means for detecting any specific terminal and an other terminal having a highest computed similarity coefficient of said computed similarity coefficients and greater than a threshold value with respect to said specific terminal by referring to said similarity coefficients managed by said second management means and said apparatus IDs also managed by said second management means;
        second detection means for detecting contents utilized in said other terminal detected by said first detection means but not used in said specific terminal also detected by said first detection means by referring to said apparatus IDs and said relevant information, which are managed by said second management means; and
        generation means for generating information suggesting said specific terminal to utilize the contents detected by said second detection means, such that the suggested contents are based on the similarity of utilizing contents with respect to the plurality of terminals as identified by the associated apparatus ID independent of which of the plurality of users utilize the pieces of content.

2. A communication system according to claim 1, wherein said first management means employed in each of said terminals records last-utilization date and time information indicating a date and a time of last utilization of the contents by associating said last-utilization date and time information with said managed utilization count and said managed relevant information.

3. A communication system according to claim 2, wherein said first management means employed in each of said terminals deletes said last-utilization date and time information as well as said relevant information and said utilization count, which are associated with said last-utilization date and time information, if said last-utilization date and time information indicates a date and a time ahead of a present time by at least a predetermined period of time.

4. A communication system according to claim 2, wherein said transmission means employed in each of said terminals transmits a utilization count and relevant information to said server only if said relevant information has a date and time ahead of a present time by a period of time shorter than a predetermined period of time.

5. A communication system according to claim 1, wherein said second management means employed in said server manages said computed similarity coefficient as well as said relevant information and said apparatus ID, which are associated with said computed similarity coefficient, only if said computed similarity coefficient is equal to or greater than the threshold value.

6. A communication system comprising a plurality of terminals and a server, wherein:
each of the plurality of terminals is accessible and utilizable by a plurality of users, wherein each of the plurality of terminals comprises:
utilization means for utilizing contents; and
transmission means for transmitting relevant information on the contents utilized by said utilization means and an apparatus ID identifying said respective terminal to said server, and wherein
said server has:
reception means for receiving said relevant information and the apparatus ID associated with respective said terminals;
first management means for updating a utilization count of the contents and managing utilization counts, said relevant information and apparatus IDs by associating said utilization counts, said relevant information and said apparatus IDs with one another, said utilization counts indicating a frequency and/or a number of times respective contents have been utilized by the utilization means;
second management means for computing a similarity coefficient between pieces of contents utilized by any two of said terminals on the basis of said utilization counts, said relevant information and said apparatus IDs, and managing said computed similarity coefficients, said relevant information and said apparatus IDs by associating said computed similarity coefficients, said relevant information and said apparatus IDs with one another;
first detection means for detecting any specific terminal and an other terminal having a highest computed similarity coefficient of said computed similarity coefficients and greater than a threshold value with respect to said specific terminal by referring to said similarity coefficients managed by said second management means and said apparatus IDs also managed by said second management means;
second detection means for detecting contents utilized in said other terminal detected by said first detection means but not used in said specific terminal also detected by said first detection means by referring to said apparatus IDs and said relevant information, which are managed by said second management means; and
generation means for generating information suggesting said specific terminal to utilize the contents detected by said second detection means, such that the suggested contents are based on the similarity of utilizing contents with respect to the plurality of terminals as identified by the assiciated apparatus ID independent of which of the pluralilty of users utilize the pieces of content.

7. A communication system according to claim 6,
wherein said first management means employed in said server records last-update date and time information indicating a date and a time of a last transmission of said relevant information and said apparatus ID from one of said terminals by associating said last-update date and time information with said managed utilization count, said managed relevant information and said managed apparatus ID.

8. A communication system according to claim 7,
wherein said first management means employed in said server deletes said last-update date and time information as well as said relevant information, said utilization count and said apparatus ID, which are associated with said last-update date and time information, if said last-update date and time information indicates a date and a time ahead of a present time by at least a predetermined period of time.

9. A communication system according to claim 7,
wherein said second management means employed in said server manages said utilization count, said relevant information, said apparatus ID and said last-update date and time information by associating said utilization count, said relevant information, said apparatus ID and said last-update date and time information with each other only if said relevant information has a date and time ahead of a present time by a period of time shorter than a predetermined period of time.

10. A communication system according to claim 6,
wherein said second management means employed in said server manages said computed similarity coefficient as well as said relevant information and said apparatus ID, which are associated with said computed similarity coefficient, only if said computed similarity coefficient is equal to or greater than the threshold value.

11. A communication terminal accessible and utilizable by a plurality of users, the communication terminal comprising:
utilization means for utilizing contents;
first management means for managing a utilization count of the contents and relevant information on the contents by associating said utilization count and said relevant information with the contents, said utilization count indicating a frequency and/or a number of times respective contents have been utilized by the utilization means;
transmission means for transmitting the utilization count, the relevant information and an apparatus ID of said communication terminal to a server via a communication route; and
reception means for receiving information on contents recommended to said communication terminal from said server based on a highest computed similarity coefficient between pieces of contents utilized by the terminal and at least one other terminal on the basis of said utilization count and the apparatus ID of the terminal, such that the recommended contents are based on the similarity of utilizing contents at the communication terminal independent of which of the plurality of users utilize the pieces of content.

12. A communication apparatus comprising:
reception means for receiving a utilization count from each of a plurality of terminals accessible and utilizable by a plurality of users, the utilization count indicative of a frequency and/or a number of times content is utilized in a terminal, relevant information on the contents and an apparatus ID identifying said terminal, from each of the plurality of terminals;
management means for computing a similarity coefficient between pieces of contents utilized by any two of said terminals on the basis of said utilization counts, said relevant information and said apparatus IDs, and managing said computed similarity coefficients, said relevant information and said apparatus IDs by associating said computed similarity coefficients, said relevant information and said apparatus IDs with one another;
first detection means for detecting any specific terminal and an other terminal having a highest computed similarity coefficient of said computed similarity coefficients and greater than a threshold value with respect to said specific terminal by referring to said similarity coefficients managed by said management means and said apparatus IDs also managed by said management means;

second detection means for detecting contents utilized in said other terminal detected by said first detection means but not used in said specific terminal also detected by said first detection means by referring to said apparatus IDs and said relevant information, which are managed by said management means; and generation means for generating information suggesting said specific terminal to utilize the contents detected by said second detection means, such that the suggested contents are based on the similarity of utilizing contents with respect to the plurality of terminals as identified by the associated apparatus ID independent of which of the plurality of users utilize the pieces of content.

13. A communication apparatus according to claim 12, wherein:

said reception means receives relevant information on contents utilized in a terminal and an apparatus ID of said terminal, from each of a plurality of terminals; and said management means updates a utilization count of the contents, manages said utilization counts, said relevant information and said apparatus IDs by associating with one another, and manages said computed similarity coefficients, said relevant information and said apparatus IDs by associating said computed similarity coefficients, said relevant information and said apparatus IDs with one another.

14. A communication method of a communication apparatus comprising:

receiving, by the communication apparatus, a utilization count from each of a plurality of terminals accesible and utilizable by a plurality of users, the utilization count indicative of a frequency and/or a number of times content is utilized in a respective terminal, relevant information on the contents and an apparatus ID identifying said respective terminal, from each of the plurality of terminals;

computing, by the communication apparatus, a similarity coefficient between pieces of contents utilized by any two of said terminals on the basis of said utilization counts, said relevant information and said apparatus IDs, and managing said computed similarity coefficients, said relevant information and said apparatus IDs by associating said computed similarity coefficients, said relevant information and said apparatus IDs with one another;

detecting any specific terminal and an other terminal having a highest computed similarity coefficient of said computed similarity coefficients and greater than a threshold value with respect to said specific terminal by referring to said similarity coefficients managed in processing carried out at said managing step and said apparatus IDs also managed in said processing carried out at said managing step;

detecting contents utilized in said other terminal detected in processing carried out at said detecting any specific terminal step but not used in said specific terminal also detected in said processing carried out at said detecting any specific terminal step by referring to said apparatus IDs and said relevant information, which are managed in said processing carried out at said managing step; and a generation step of generating information suggesting said specific terminal to utilize the contents detected in processing carried out at said detecting contents step, such that the suggested contents are based on the similarity of utilizing contents with respect to the plurality of terminals as identified by the associated apparatus ID independent of which of the plurality of users utilize the pieces of content.

15. A recording medium used for storing a computer-readable program that, when executed by a processor, performs a method comprising:

receiving a utilization count from each of a plurality of terminals accessible and utilizable by a plurality of users, the utilization count indicative of a frequency and/or a number of times content is utilized in a respective terminal, relevant information on the contents and an apparatus ID identifying said respective terminal, from each of the plurality of terminals;

computing a similarity coefficient between pieces of contents utilized by any two of said terminals on the basis of said utilization counts, said relevant information and said apparatus IDs, and managing said computed similarity coefficients, said relevant information and said apparatus IDs by associating said computed similarity coefficients, said relevant information and said apparatus IDs with one another;

detecting any specific terminal and an other terminal having a highest computed similarity coefficient of said computed similarity coefficients and greater than a threshold value with respect to said specific terminal by referring to said similarity coefficients managed in processing carried out at said managingt step and said apparatus IDs also managed in said processing carried out at said managing step;

detecting contents utilized in said other terminal detected in processing carried out at said detecting any apecific terminal step but not used in said specific terminal also detected in said processing carried out at said detecting any specific terminal step by referring to said apparatus IDs and said relevant information, which are managed in said processing carried out at said managing step; and generating information suggesting said specific terminal to utilize the contents detected in processing carried out at said detecting contents step, such that the suggested contents are based on the similarity of utilizing contents with respect to the plurality of terminals as identified by the associated apparatus ID independent of which of the plurality of users utilize the pieces of content.

* * * * *